(12) United States Patent
Nakaoka

(10) Patent No.: US 7,838,148 B2
(45) Date of Patent: Nov. 23, 2010

(54) LITHIUM NICKEL MANGANESE COBALT COMPOSITE OXIDE USED AS CATHODE ACTIVE MATERIAL FOR LITHIUM RECHARGEABLE BATTERY, MANUFACTURING METHOD THEREOF, AND LITHIUM RECHARGEABLE BATTERY

(75) Inventor: Yasuhiro Nakaoka, Tokyo (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 0 days.

(21) Appl. No.: 12/393,074

(22) Filed: Feb. 26, 2009

(65) Prior Publication Data

US 2009/0226811 A1    Sep. 10, 2009

(30) Foreign Application Priority Data

Feb. 27, 2008 (JP) .............................. 2008-045767

(51) Int. Cl.
*H01M 4/52* (2010.01)
(52) U.S. Cl. .................. 429/223; 429/231.95; 429/224; 429/231.3
(58) Field of Classification Search ................. 429/223, 429/231.95, 224, 231.3
See application file for complete search history.

(56) References Cited

U.S. PATENT DOCUMENTS

| 2005/0220700 A1 | 10/2005 | Suhara et al. |
| 2005/0271944 A1 | 12/2005 | Suhara et al. |
| 2007/0190419 A1* | 8/2007 | Takezawa ................ 429/231.1 |

FOREIGN PATENT DOCUMENTS

| JP | 2001-148249 | 5/2001 |
| JP | 2006-117517 | 5/2006 |
| WO | 2004/082046 | 9/2004 |
| WO | 2005/020354 | 3/2005 |

* cited by examiner

*Primary Examiner*—Jane Rhee
(74) *Attorney, Agent, or Firm*—Greenblum & Bernstein

(57) ABSTRACT

A lithium nickel manganese cobalt composite oxide used as a cathode active material for a lithium rechargeable battery, the composite oxide shown by the below general formula (1):

$$Li_xNi_{1-y-z}Mn_yCo_zO_2 \qquad (1)$$

(wherein $0.9 \leqq x \leqq 1.3$, $0<y<1.0$, and $0<z<1.0$; and wherein $y+z<1$),
the lithium nickel manganese cobalt composite oxide having an average particle size of 5-40 μm, a BET ratio surface area of 5-25 m²/g, and a tap density of equal to or higher than 1.70 g/ml.

5 Claims, 1 Drawing Sheet

LITHIUM NICKEL MANGANESE COBALT COMPOSITE OXIDE USED AS CATHODE ACTIVE MATERIAL FOR LITHIUM RECHARGEABLE BATTERY, MANUFACTURING METHOD THEREOF, AND LITHIUM RECHARGEABLE BATTERY

CROSS-REFERENCE TO RELATED APPLICATIONS

The present application claims priority under 35 U.S.C. §119 of Japanese Application No. 2008-045767, filed on Feb. 27, 2008, the disclosure of which is expressly incorporated by reference herein in its entirety.

BACKGROUND OF THE INVENTION

1. Field of the Invention

The present invention relates to a lithium nickel manganese cobalt composite oxide used as a cathode active material for a lithium rechargeable battery, a manufacturing method thereof, and a lithium rechargeable battery using the composite oxide as a cathode active material.

2. Description of Related Art

Conventionally, lithium cobalt oxide has been used as a cathode active material for lithium rechargeable batteries. However, since cobalt is rare metal, a lithium nickel manganese cobalt composite oxide with low cobalt content (e.g., Related Arts 1 and 2) has been developed.

In recent years, batteries having a superior rapid charge characteristic are in demand for electric automobiles and electric power tools. One of the methods for enabling rapid charging is to increase a specific surface area of a cathode material. However, the conventionally developed lithium nickel manganese cobalt composite oxide has a small specific surface area.

Many of conventional methods for synthesizing a lithium nickel manganese cobalt composite oxide use a nickel manganese cobalt composite hydroxide as a parent material. However, this material also has a small specific surface area, and therefore the resulting lithium nickel manganese cobalt composite oxide has a small specific surface area.

Meanwhile, a method using a manganese cobalt composite carbonate as a parent material has been proposed. Related Art 3 discloses a manufacturing method of a nickel manganese cobalt composite carbonate in which a solution containing a sulfate of nickel, manganese, and cobalt and an aqueous solution containing an ammonium bicarbonate are simultaneously or alternately added to a solution containing water by a falling-drop method while maintaining pH of the mixture at 6.5-8.5, so as to cause a reaction. Related Art 4 discloses a method in which a solution containing a sulfate of nickel, manganese, and cobalt and an aqueous solution containing a sodium carbonate are simultaneously added to a solution containing water, so as to cause a reaction.

However, the composite carbonate obtained by the methods disclosed in Related Arts 3 and 4 has a low tap density of less than 1.7 ml/g, while having a BET ratio surface area of equal to or larger than 40 m²/g. Therefore, the lithium nickel manganese cobalt composite oxide generated by using the composite carbonate has a problem of a low filling density in a cathode active material when an electrode is created.

In addition, it has been desired that a lithium rechargeable battery using a lithium nickel manganese cobalt composite oxide as a cathode active material have enhanced battery performance, in particular, cyclic and load characteristics.

[Related Art 1] International Publication No. WO 2004/082046 pamphlet
[Related Art 2] International Publication No. WO 2005/020354 pamphlet
[Related Art 3] Japanese Patent Laid Open Publication No. 2001-148249, pages 7 and 9
[Related Art 4] Japanese Patent Laid Open Publication No. 2006-117517, page 7

SUMMARY OF THE INVENTION

A purpose of the present invention is to provide a lithium nickel manganese cobalt composite oxide that provides a lithium rechargeable battery using the composite oxide as a cathode active material with enhanced battery performance, in particular, superior cyclic and load characteristics; an industrially advantageous manufacturing method of the lithium nickel manganese cobalt composite oxide used as a cathode active material for a lithium rechargeable battery; and a lithium rechargeable battery having enhanced battery performance, in particular, cyclic and load characteristics.

To resolve the above-described problems associated with the conventional technologies, the inventor of the present invention has conducted intensive studies and found that a lithium rechargeable battery using a lithium nickel manganese cobalt composite oxide as a cathode active material exhibits enhanced battery performance, in particular, superior cyclic and load characteristics, the lithium nickel manganese cobalt composite oxide having an average particle size of 5-40 μm, and a specified range of large BET ratio surface area and high tap density, and being shown by the below general formula (1):

$$\mathrm{Li}_x\mathrm{Ni}_{1-y-z}\mathrm{Mn}_y\mathrm{Co}_z\mathrm{O}_2 \qquad (1)$$

(wherein 0.9≦x≦1.3, 0<y<1.0, and 0<z<1.0; and wherein y+z<1).

The inventors also found that the lithium nickel manganese cobalt composite oxide obtained by sintering a mixture of a lithium nickel manganese cobalt composite carbonate and a lithium compound in a specified range of sintering temperature provides a lithium rechargeable battery with enhanced battery performance, in particular, superior cyclic and load characteristics, the composite carbonate having the specified range of average particle size, BET ratio surface area, and tap density. The present invention has been accomplished based on these findings.

Therefore, an aspect (1) of the present invention provides a lithium nickel manganese cobalt composite oxide used as a cathode active material for a lithium rechargeable battery that is shown by the below general formula (1):

$$\mathrm{Li}_x\mathrm{Ni}_{1-y-z}\mathrm{Mn}_y\mathrm{Co}_z\mathrm{O}_2 \qquad (1)$$

(wherein 0.9≦x≦1.3, 0<y<1.0, and 0<z<1.0; and wherein y+z<1).

The lithium nickel manganese cobalt composite oxide has an average particle size of 5-40 μm, a BET ratio surface area of 5-25 m²/g, and a tap density of equal to or higher than 1.70 g/ml.

An aspect (2) of the present invention provides a manufacturing method of a lithium nickel manganese cobalt composite oxide used as a cathode active material for a lithium rechargeable battery. According to the manufacturing method, a lithium compound is mixed with a composite carbonate containing nickel atoms, manganese atoms, and cobalt atoms at a molar ratio in a range of 1:0.5-2.0:0.5-2.0, and having an average particle size of 5-40 μm, a BET ratio surface area of equal to or larger than 40 m²/g, and a tap density of equal to or higher than 1.7 g/ml, so as to obtain a mixed sintering material; and then the mixed sintering material is sintered at 650-850° C., so as to obtain the lithium nickel manganese cobalt composite oxide shown in the below general formula (1):

$$Li_xNi_{1-y-z}Mn_yCo_zO_2 \quad (1)$$

(wherein 0.9≦x≦1.3, 0<y<1.0, and 0<z<1.0; and wherein y+z<1).

An aspect (3) of the present invention provides a lithium rechargeable battery using the lithium nickel manganese cobalt composite oxide according to the aspect (1) of the present invention as a cathode active material.

The lithium nickel manganese cobalt composite oxide used as a cathode active material for a lithium rechargeable battery according to the present invention provides enhanced battery performance, in particular, superior cyclic and load characteristics. In addition, the manufacturing method thereof according to the present invention provides the lithium nickel manganese cobalt composite oxide of the present invention, which is used as a cathode active material for a lithium rechargeable battery, in an industrially advantageous manner. Furthermore, the lithium rechargeable battery according to the present invention is provided with enhanced battery performance, in particular, superior cyclic and load characteristics.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
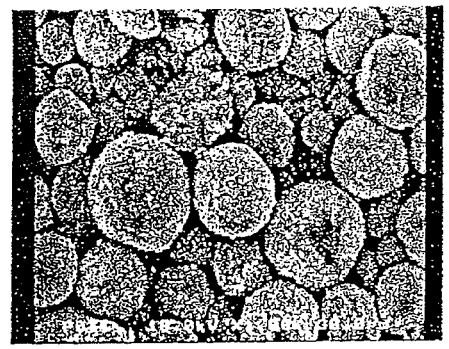
FIG. 1 is an SEM image of a lithium nickel manganese cobalt composite oxide obtained in embodiment 2 (enlarged by 1000 times)

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The present invention is explained in the following based on the embodiments. A lithium nickel manganese cobalt composite oxide used as a cathode active material for a lithium rechargeable battery according to the present invention (hereinafter, also referred to as the composite oxide of the present invention) is shown by the below general formula (1):

$$Li_xNi_{1-y-z}Mn_yCo_zO_2 \quad (1),$$

(wherein 0.9≦x≦1.3, 0<y<1.0, and 0<z<1.0; and wherein y+z<1).

The lithium nickel manganese cobalt composite oxide has an average particle size of 5-40 μm, a BET ratio surface area of 5-25 m²/g, and a tap density of equal to or higher than 1.70 g/ml.

The composite oxide of the present invention is used as a cathode active material for a lithium rechargeable battery.

The composite oxide of the present invention is a lithium nickel manganese cobalt composite oxide shown by the general formula (1). In order to simultaneously achieve both cost reduction and safety, y is preferably 0.45-0.55, and z is preferably 0.45-0.55.

The composite oxide of the present invention is basically formed of secondary particles consisting of aggregates of fine primary particles. The secondary particles or the composite oxide of the present invention has an average particle size of 5-40 μm, preferably 5-25 μm, when measured by a laser particle size distribution measurement method. A lithium nickel manganese cobalt composite oxide having the above range of average particle size provides a higher filling density and improved battery performance. On the other hand, a lithium nickel manganese cobalt composite oxide having an average particle size smaller than the above range causes a low filling density in a cathode active material when an electrode is created. A lithium nickel manganese cobalt composite oxide having an average particle size exceeding the above range causes lithium ions in an active material to travel a long distance, thus deteriorating battery performance.

The BET ratio surface area of the composite oxide of the present invention is 5-25 m²/g, preferably 5-20 m²/g. A lithium nickel manganese cobalt composite oxide having the above range of BET ratio surface area improves safety and a load characteristic. On the other hand, a lithium nickel manganese cobalt composite oxide having a BET ratio surface area smaller than the above range does not improve the load characteristic. A lithium nickel manganese cobalt composite oxide having a BET ratio surface area exceeding the above range reduces safety.

The tap density of the composite oxide of the present invention is equal to or higher than 1.70 g/ml, preferably 1.70-1.90 g/ml. A lithium nickel manganese cobalt composite oxide having the above range of tap density provides a higher filling density and improved battery performance, in particular, an energy density. On the other hand, a lithium nickel manganese cobalt composite oxide having a tap density lower than the above range causes a low filling density in a cathode active material when an electrode is created.

In the present invention, a ratio (A/B) of the BET ratio surface area (A) to a theoretical ratio surface area (B) is preferably 5-50, more preferably 10-50. The inventors found that a lithium nickel manganese cobalt composite oxide having the above range of ratio (A/B) of the BET ratio surface area (A) to the theoretical ratio surface area (B) further improves the load characteristic.

Figure 2:
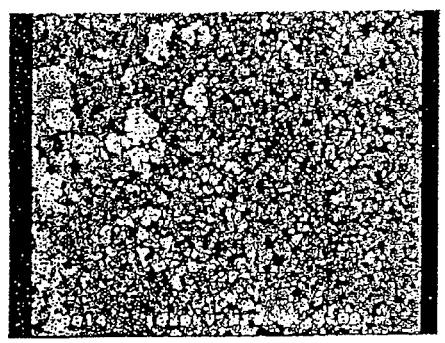
FIG. 2 is an SEM image of the lithium nickel manganese cobalt composite oxide obtained in embodiment 2 (enlarged by 10000 times)
Figure 3:
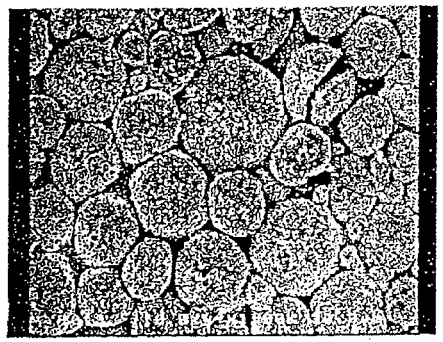
FIG. 3 is an SEM image of a lithium nickel manganese cobalt composite oxide obtained in comparative example 4 (enlarged by 1000 times)
Figure 4:
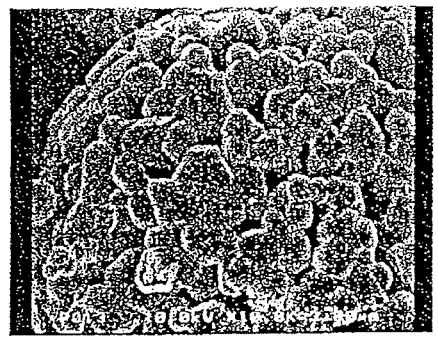
FIG. 4 is an SEM image of the lithium nickel manganese cobalt composite oxide obtained in comparative example 4 (enlarged by 10000 times).

In the present invention, the theoretical ratio surface area (B) is obtained from a sphere-equivalent area average particle size (number base) measured by a laser particle size distribu tion measurement method. Specifically, the theoretical ratio surface area (B) is calculated by the following equation (2):

$$\text{Theoretical ratio surface area }(B)\text{ (m}^2/\text{g)}=6/(\rho\times MA) \quad (2),$$

wherein MA represents an area average particle size (μm), and ρ represents a density of the lithium nickel manganese cobalt composite oxide. MA can be calculated by the following equation (3):

$$MA=\Sigma(n_i a_i d_i)/\Sigma(n_i a_i) \quad (3),$$

which means that MA can be calculated by:

$$MA=(n_1 a_1 d_1+n_2 a_2 d_2+\ldots+n_i a_i d_i+\ldots+n_k a_k d_k)/(n_1 a_1+n_2 a_2+\ldots+n_i a_i+\ldots+n_k a_k)$$

when $n_1, n_2, \ldots n_i, \ldots n_k$ pieces of particles having a particle size of $d_1, d_2, \ldots d_i, \ldots d_k$ respectively in an ascending order present in one group of fine particles, and a surface area of one particle is $a_1, a_2, \ldots a_i, \ldots a_k$ respectively. The BET ratio surface area (A) is a BET ratio surface area of the actually measured lithium nickel manganese cobalt composite oxide. The larger the ratio (A/B) of the BET ratio surface area (A) to the theoretical ratio surface area (B) is, the larger the surface area of a particle surface is and the more complex the shape is. The composite oxide of the present invention is basically formed of secondary particles consisting of aggregates of fine primary particles, and the secondary particles have a spherical shape. The closer to 1 the ratio (A/B) is, the smoother the surface is. In the present invention, the load characteristic is further improved when the lithium nickel manganese cobalt composite oxide has the ratio (A/B) of the BET ratio surface area (A) to the theoretical ratio surface area (B) of preferably 5-50, more preferably 10-50. In addition, the higher a sintering temperature is in the manufacturing process of the lithium nickel manganese cobalt composite oxide used as a cathode active material for a lithium rechargeable battery (to be described later), the closer to 1 the ratio (A/B) is. Moreover, according to the changes in the particle surfaces in accordance with the increase of the sintering temperature shown in scanning electron microscopic images (SEM images) (refer to FIGS. 2 and 4), each primary particle is sintered and bonded to others at a sintering temperature of equal to or higher than 900° C., hence smaller void space between the primary particles at least in an aggregate particle surface. From the above observations, it is considered that the composite oxide of the present invention within the above range of ratio (A/B) of the BET ratio surface area (A) to the theoretical ratio surface area (B) maintains appropriate void space in the aggregate particles that allows smooth Li insertion and extraction from a composite oxide crystal surface.

In terms of providing a lithium rechargeable battery with superior battery performance, in particular, a superior load characteristic, it is preferable that the composite oxide of the present invention be obtained by mixing a lithium compound with a composite carbonate containing nickel atoms, manganese atoms, and cobalt atoms and having an average particle size of 5-40 μm, a BET ratio surface area of equal to or larger than 40 m²/g, and a tap density of equal to or higher than 1.7 g/ml, so as to obtain a mixed sintering material, and then by sintering the mixed sintering material at 650-850° C.

Next, a manufacturing method of a lithium nickel manganese cobalt composite oxide used as a cathode active material for a lithium rechargeable battery according to the present invention is explained. In the manufacturing method of the lithium nickel manganese cobalt composite oxide used as a cathode active material for a lithium rechargeable battery according to the present invention (hereinafter, also referred to as the manufacturing method of the present invention), a lithium compound is mixed with a composite carbonate containing nickel atoms, manganese atoms, and cobalt atoms at a molar ratio in a range of 1:0.5-2.0:0.5-2.0 and having an average particle size of 5-40 μm, a BET ratio surface area of equal to or larger than 40 m²/g, and a tap density of equal to or higher than 1.7 g/ml, so as to obtain a mixed sintering material; and then the mixed sintering material is sintered at 650-850° C., so as to obtain the lithium nickel manganese cobalt composite oxide shown in the below general formula (1):

$$Li_xNi_{1-y-z}Mn_yCo_zO_2 \quad (1)$$

(wherein $0.9 \leq x \leq 1.3$, $0<y<1.0$, and $0<z<1.0$; and wherein $y+z<1$).

Initially, in the manufacturing method of the present invention, the lithium compound according to the manufacturing method of the present invention is mixed with the lithium nickel manganese cobalt composite carbonate according to the manufacturing method of the present invention. Hereinafter, the lithium nickel manganese cobalt composite carbonate according to the manufacturing method of the present invention is also referred to as the material composite carbonate.

Examples of the lithium compound according to the manufacturing method of the present invention include an oxide, a hydroxide, a carbonate, a nitrate, an organic acid salt, and the like of lithium. The lithium carbonate is preferable among the above compounds in terms of easy availability in the industry and superior reactivity with the composite carbonate. The lithium compound according to the manufacturing method of the present invention has an average particle size of preferably 1-100 μm, more preferably 3-80 μm, in terms of superior reactivity, when measured by a laser particle size distribution measurement method.

The material composite carbonate contains nickel atoms, manganese atoms, and cobalt atoms at a molar ratio in a range of 1:0.5-2.0:0.5-2.0, preferably, 1:0.95-1.05:0.95-1.05.

The inventors found that, in manufacturing of the lithium nickel manganese cobalt composite oxide, the property of the lithium nickel manganese cobalt composite oxide relates to the average particle size, ratio surface area, and tap density of the material composite carbonate. The inventors also found that the ratio surface area largely depends on a sintering temperature. The inventors further found that, in a sintering temperature range of 650-850° C., the resulting product generally inherits the average particle size and tap density in many cases, though there may have been cases in which slight changes are seen.

Accordingly, the average particle size of the material composite carbonate is 5-40 μm, preferably 5-25 μm, and the tap density thereof is equal to or higher than 1.7 g/ml, preferably, 1.7-1.9 g/ml. The material composite carbonate having the above range of average particle size and tap density causes a lithium nickel manganese cobalt composite oxide to have an average particle size and a tap density in the range of those of the composite oxide of the present invention. In short, the material composite carbonate having the above range of average particle size and tap density improves battery performance.

The BET ratio surface area of the material composite carbonate is equal to or larger than 40 m²/g, preferably, 50-130 m²/g. The material composite carbonate having the above range of BET ratio surface area causes a lithium nickel manganese cobalt composite oxide to have a BET ratio surface area in the range of 5-25 $m^2/g$ when a mixed sintering material is sintered at 650-850° C.

It is preferable that material composite carbonate have substantially spherical particles.

The material composite carbonate is manufactured by, for example, the methods below:

(1) A manufacturing method in which the composite carbonate is obtained by adding a solution A1 containing a nickel salt, a manganese salt, and a cobalt salt and a solution B1 containing a metal carbonate or a metal hydrogen carbonate to a solution C1 containing anions similar to those of the nickel salt, manganese salt, and cobalt salt in the solution A1 and anions similar to those of the metal carbonate or metal hydrogen carbonate in the solution B1, so as to cause a reaction;

(2) A manufacturing method in which the composite carbonate is obtained by adding a solution A2 containing nickel ions, manganese ions, and cobalt ions and a solution B2 containing carbonate ions or hydrogen carbonate ions into a reaction vessel, so as to cause a reaction, wherein the solution A2 and the solution B2 are simultaneously and continuously added to the reaction vessel, so as to cause a reaction; a slurry containing the composite carbonate is separated; and the separated slurry is collected from a reaction vessel overflow.

A preferred embodiment of the manufacturing method (1) of the composite carbonate includes, for example, a method wherein the solution A and the solution B are simultaneously or alternately added to the solution C, so as to cause a reaction, while the temperature is maintained at 10-90° C., preferably 20-80° C. In the solution A1, a nickel chloride, a manganese chloride, and a cobalt chloride are dissolved in water at an atom equivalent ratio of nickel atoms:manganese atoms:cobalt atoms at preferably 1:0.9-1.1:0.9-1.1, more preferably 1:0.95-1.05:0.95-1.05. In the solution B1, a sodium hydrogen carbonate is dissolved in water. In the solution C1, a sodium chloride and a sodium hydrogen carbonate are dissolved in water. The amount of the solutions A1 and B1 added to the solution C1 is such that the ratio ($CO_3$/M) of the total mole number ($CO_3$) of carbonate ions and hydrogen carbonate ions in terms of $CO_3$ in a reaction solution to the total mole number (M) of the nickel ions, manganese ions, and cobalt ions added from the solution A1 to the solution C1 is preferably 2-7, more preferably, 3-6. Herein, the total mole number of the carbonate ions and hydrogen carbonate ions in terms of $CO_3$ in the reaction solution is the total mole number in terms of $CO_3$ of the preexisting carbonate ions and hydrogen carbonate ions in the solution C1 and the added carbonate ions and hydrogen carbonate ions from the solution B1 to the solution C1.

An embodiment of the manufacturing method (2) of the composite carbonate includes, for example, a method wherein the solution A2 in which nickel chloride, manganese chloride, and cobalt chloride are dissolved in water at an atom equivalent ratio of nickel atoms:manganese atoms:cobalt atoms at preferably 1:0.9-1.1:0.9-1.1, particularly preferably 1:0.95-1.05:0.95-1.05, and the solution B2 in which sodium hydrogen carbonate is dissolved in water are simultaneously and continuously added into a reaction vessel, so as to cause a reaction, while the temperature is maintained at 10-90° C., preferably 50-80° C.; a slurry containing the composite carbonate is separated; and the separated slurry is collected from a reaction vessel overflow. At that time, it is preferable that the following conditions be satisfied: (D1) A condition in which each addition rate of the nickel ions, manganese ions, and cobalt ions contained in the solution A2 per liter of the reaction solution is equal to or lower than 0.1 mole/hour/liter, preferably 0.8 mole/hour/liter, in terms of atoms; and the addition rate of the hydrogen carbonate ions contained in the solution B2 per liter of the reaction solution is equal to or lower than 0.5 mole/hour/liter, preferably 0.4 mole/hour/liter in terms of $CO_3$; and (D2) A condition in which the ratio of the amount of the added hydrogen carbonate ions in terms of $CO_3$ to the total additive amount of the nickel ions, manganese ions, and cobalt ions in terms of atoms is 2-10, preferably 3-8, at a molar ratio. In addition, it is preferable that the average residence time of the composite carbonate be equal to or less than 3 hours, preferably, 0.5-3 hours.

Then, a predetermined amount of a lithium compound and the material composite carbonate are mixed in a dry or wet method, so as to obtain a mixed sintering material. The mixing may be done in either a wet or dry method; however, the dry method is preferable in terms of easy manufacturing. In a case of the dry method mixing, it is preferable that a blender or the like be used for uniformly mixing the material.

The mixing ratio between the lithium compound and the material composite carbonate is 0.8-1.3, preferably 0.9-1.1, at a molar ratio (Li/M) of the lithium atoms in the lithium compound to the total mole number (M) of the nickel atoms, manganese atoms, and cobalt atoms in the material composite carbonate. The above range of mixing ratio between the lithium compound and the material composite carbonate provides a lithium rechargeable battery with a high discharging capacity and a superior cyclic characteristic. On the other hand, when the mixing ratio between the lithium compound and the material composite carbonate according to the present invention is smaller than the above range, a lithium rechargeable battery has a reduced initial discharging capacity. When the mixing ratio exceeds the above range, a lithium rechargeable battery has a poor cyclic characteristic.

In the manufacturing method of the present invention, subsequently, the material composite carbonate is sintered at 650-850° C., preferably 700-800° C. The composite oxide of the present invention is obtained by sintering the material composite carbonate at a sintering temperature in the above range. On the other hand, when the sintering temperature of the mixed sintering material is lower than the above range, the lithium nickel manganese cobalt composite oxide has a BET ratio surface area exceeding 25 $m^2/g$, thereby reducing safety of a lithium rechargeable battery. When the sintering temperature of the mixed sintering material exceeds the above range, the lithium nickel manganese cobalt composite oxide has a BET ratio surface area smaller than 5 $m^2/g$, thereby deteriorating a load characteristic of a lithium rechargeable battery.

The sintering duration of the mixed sintering material is generally equal to or longer than 2 hours, preferably 3-12 hours. With regard to the sintering atmosphere, there is no specific restriction, and the sintering may be performed in either an air atmosphere or an oxygen atmosphere. When sintering a mixed sintering material that generates water, it is preferable that the sintering of the mixed sintering material be performed in multiple steps in an air atmosphere or an oxygen atmosphere. Specifically, it is preferable that the mixed sintering material be slowly sintered for preferably 1-10 hours, at a temperature range of 200-400° C., at which water contained in the mixed sintering material vaporizes. Then, the temperature is rapidly increased up to 650-850° C., and the mixed sintering material is further sintered for 1-30 hours.

In the manufacturing method of the present invention, the sintering process may be performed as many times as desired. Alternatively, in order to have a uniform powder characteristic, the sintered material may be ground and again sintered.

After sintering the mixed sintering material, the lithium nickel manganese cobalt composite oxide is obtained by appropriately cooling and grinding the material as needed. The grinding process that is performed as needed may be done in a case where the lithium nickel manganese cobalt composite oxide resulting from the sintering of the mixed sintering material is in a state of weakly bonded bulks or other like states.

In the manufacturing method of the present invention, the lithium nickel manganese cobalt composite oxide resulting from the sintering of the mixed sintering material is shown by the general formula (1), wherein y is preferably 0.45-0.55, and z is preferably 0.45-0.55.

The lithium nickel manganese cobalt composite oxide resulting from the manufacturing method of the present invention has an average particle size of 5-40 μm, preferably 5-25 μm; a BET ratio surface area of 5-25 $m^2/g$, preferably 5-20 $m^2/g$; and a tap density of equal to or higher than 1.7 g/ml, preferably 1.70-1.90 g/ml.

The lithium nickel manganese cobalt composite oxide obtained by the manufacturing method of the present invention has a ratio (A/B) of the BET ratio surface area (A) to a theoretical ratio surface area (B) of 5-50, preferably 10-50, in addition to having the above-described powder characteristic.

The lithium rechargeable battery of the present invention uses the lithium nickel manganese cobalt composite oxide of the present invention as a cathode active material. The lithium rechargeable battery of the present invention includes a cathode, an anode, a separator, and a non-aqueous electrolyte containing a lithium salt.

The cathode of the lithium rechargeable battery of the present invention is formed, for example, by applying a cathode mix to a cathode current collector and then drying it. The cathode mix includes a cathode active material, a conductive substance, an adhesive agent, a filler that is added as needed, and the like. The lithium nickel manganese cobalt composite oxide of the present invention to be used as a cathode active material for a lithium rechargeable battery is uniformly applied to the cathode of the lithium rechargeable battery of the present invention. Therefore, the lithium rechargeable battery of the present invention has enhanced battery performance, in particular, superior load and cyclic characteristics.

It is desirable that the content of the cathode active material in the cathode mix of the lithium rechargeable battery of the present invention is 70-100 wt %, preferably 90-98 wt %.

With regard to the cathode current collector according to the lithium rechargeable battery of the present invention, there is no specific restriction as far as it is an electronic conductor that does not cause a chemical change in the battery that includes the cathode current collector. Examples of the cathode current collector include a stainless steel, a nickel, an aluminum, a titanium, a sintered carbon, and a stainless steel and an aluminum having their surfaces treated with carbon, nickel, titanium, or silver. These materials can be used by oxidizing the surfaces thereof, or the current collector can be treated to have a convexo-concave surface. Examples of the form of the current collector include a foil, a film, a sheet, a net, a punched object, a lath structure, a porous body, a foam, fibers, and an unwoven compact. Although there is no specific restriction with regard to the thickness of the current collector, it is preferable that the thickness be 1-500 μm.

With regard to the conductive substance according to the lithium rechargeable battery of the present invention, there is no specific restriction as far as it is an electronic conductive material that does not cause a chemical change in the battery that includes the conductive substance. Examples of the conductive substance include a graphite (such as a natural graphite and an artificial graphite), a carbon black (such as a carbon black, an acetylene black, a Ketjen black, a channel black, a furnace black, a lamp black and a thermal black), a conductive fiber (such as a carbon fiber and a metallic fiber), a metal powder (such as a carbon fluoride powder, an aluminum powder, and a nickel powder), a conductive whisker (such as a zinc oxide and a potassium titanate), a conductive metal oxide (such as a titanium oxide), and a conductive material (such as a polyphenylene dielectric). Examples of the natural graphite include a lepidic graphite, a scale-like graphite, and an amorphous graphite. These materials can be used alone or in combination of two or more. A composition ratio of the conductive substance in the cathode mix is 1-50 wt %, preferably 2-30 wt %.

Examples of the adhesive agent according to the lithium rechargeable battery of the present invention include a starch, a polyvinylidene fluoride, a polyvinyl alcohol, a carboxymethyl cellulose, a hydroxypropyl cellulose, a regenerated cellulose, a diacetyl cellulose, a polyvinylpyrrolidone, a tetrafluoroethylene, a polyethylene, a polypropylene, an ethylene-propylene-diene terpolymer (EPDM), a sulfonated EPDM, a styrene-butadiene rubber, a fluorine-containing rubber, a tetrafluoroethylene-hexafluoroethylene copolymer, a tetrafluoroethylene-hexafluoropropylene copolymer, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, an ethylene-acrylic acid copolymer or its ($Na^+$) ion cross-liking agent, an ethylene-methacryl acid copolymer or its ($Na^+$) ion cross-liking agent, an ethylene-methyl acrylate copolymer or its ($Na^+$) ion cross-liking agent, an ethylene-methyl methacrylate copolymer or its ($Na^+$) ion cross-liking agent, a polysaccharide such as a polyethylene oxide, a thermoplastic resin, and a rubber-elastic polymer. These materials can be used alone or in combination of two or more. When using a compound containing a functional group such as a polysaccharide that reacts with lithium, it is preferable to deactivate its functional group by adding a compound such as an isocyanate group, for example. A composition ratio of the adhesive agent in the cathode mix is 1-50 wt %, preferably 5-15 wt %.

The filler according to the lithium rechargeable battery of the present invention in the cathode mix is to inhibit volume expansion of the cathode, and is added as needed. Any fibrous material that does not cause chemical change in a battery containing the material can be used as the filler. For example, fibers of an olefin-based polymer such as a polypropylene and a polyethylene, a glass and carbon are used. Although there is no specific restriction with respect to the additive amount of the filler in the cathode mix, it is preferable that the amount be 0-30 wt %.

The anode according to the lithium rechargeable battery of the present invention is formed by applying an anode material to an anode current collector, and then drying it. With regard to the anode current collector, there is no specific restriction as far as it is an electronic conductor that does not cause a chemical change in the battery that includes the anode current collector. Examples of the anode current collector include a stainless steel, a nickel, a copper, a titanium, an aluminum, a sintered carbon, a copper and a stainless steel having their surfaces treated with carbon, nickel, titanium and silver, or an aluminum-cadmium alloy. These materials can be used by oxidizing the surfaces thereof, or the current collector can be treated to have a convexo-concave surface. Examples of the form of the current collector include a foil, a film, a sheet, a net, a punched object, a lath structure, a porous body, a foam, fibers, and an unwoven compact. Although there is no specific restriction with regard to the thickness of the current collector, it is preferable that the thickness be 1-500 µm.

With regard to the anode material according to the lithium rechargeable battery of the present invention, there is no specific restriction. Examples of the anode material include a carbonaceous material, a metal composite oxide, a lithium metal, a lithium alloy, a silicon based alloy, a tin based alloy, a metal oxide, a conductive polymer, a chalcogen compound, a Li—Co—Ni based material, and a lithium titanate. Examples of the carbonaceous material include non-graphitized carbon material and graphitized carbon material. Examples of the metal composite oxide include compounds such as $Sn_p(M^1)_{1-p}(M^2)_q O_r$ ($M^1$ represents one or more elements selected from Mn, Fe, Pb and Ge; $M^2$ represents one or more elements selected from Al, B, P, Si, elements from Group 1, Group 2 and Group 3 of the Periodic Table, and halogen elements; $0<p\leq1$; $1\leq q\leq3$; and $1\leq r\leq8$), $Li_tFe_2O_3$ ($0\leq t\leq1$), $Li_tWO_2$ ($0\leq t\leq1$). Examples of the metal oxide include GeO, $GeO_2$, SnO, $SnO_2$, PbO, $PbO_2$, $Pb_2O_3$, $Pb_3O_4$, $Sb_2O_3$, $Sb_2O_4$, $Sb_2O_5$, $Bi_2O_3$, $Bi_2O_4$, and $Bi_2O_5$. Examples of the conductive polymer include a polyacetylene, and a poly-p-phenylene.

As the separator according to the lithium rechargeable battery of the present invention, an insulating thin film having a large ion permeability and a predetermined mechanical strength is used, such as a sheet or an unwoven fabric made of an olefin based polymer (such as a polypropylene, for its organic solvent resistance and hydrophobicity), glass fibers or a polyethylene. Pore sizes of the separator are kept in a range generally useful for a battery, for example, 0.01-10 µm. The thickness of the separator is kept in a range generally useful for a battery, for example, 5-300 µm. In a case where a solid state electrolyte such as a polymer is used as an electrolyte (to be described later), the solid state electrolyte may double as a separator.

The non-aqueous electrolyte containing a lithium salt according to the lithium rechargeable battery of the present invention is formed from a non-aqueous electrolyte and a lithium salt. As the non-aqueous electrolyte according to the lithium rechargeable battery of the present invention a non-aqueous electrolytic solution, an organic solid state electrolyte, and an inorganic solid state electrolyte are used. Examples of the non-aqueous electrolytic solution include a solvent containing one or more non-protonic organic solvents such as N-methyl-2-pyrrolidinone, a propylene carbonate, an ethylene carbonate, a butylene carbonate, a dimethyl carbonate, a diethyl carbonate, a γ-butyrolactone, a 1,2-dimethoxyethane, a tetrahydroxyfuran, a 2-methyltetrahydrofuran, a dimethylsulfoxide, a 1,3-dioxolan, a formamide, a dimethylformamide, a dioxolan, an acetonitrile, a nitromethane, a methyl formate, a methyl acetate, a phosphate triester, a trimethoxymethane, a dioxolan derivative, a sulfolane, a methylsulfolane, a 3-methyl-2-oxazolidinone, a 1,3-dimethyl-2-imidazolidinone, a propylene carbonate derivative, a tetrahydroxyfuran derivative, a diethyl ether, a 1,3-propane sultone, a methyl propionate, and an ethyl propionate.

Examples of the organic solid state electrolyte according to the lithium rechargeable battery of the present invention include a polyethylene derivative; a polyethylene oxide derivative or a polymer containing a polyethylene oxide derivative; a polypropylene oxide derivative or a polymer containing a polypropylene oxide derivative; an ester phosphate polymer; a polymer containing an ionic dissociable group such as a polyphosphazene, a polyaziridine, a polyethylene sulfate, a polyvinyl alcohol, a polyvinylidene fluoride, and a polyhexafluoropropylene; and a mixture of a polymer containing the ionic dissociable group and the above-described non-aqueous electrolyte solution.

As the inorganic solid state electrolyte according to the lithium rechargeable battery of the present invention, a nitride, a halide, an oxyacid salt and a sulfide of Li can be used, and examples of such materials include $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $P_2S_5$, $Li_2S$ or $Li_2S$—$P_2S_5$, $Li_2S$—$SiS_2$, $Li_2S$—$GeS_2$, $Li_2S$—$Ga_2S_3$, $Li_2S$—$B_2S_3$, $Li_2S$—$P_2S_5$—X, $Li_2S$—$SiS_2$—X, $Li_2S$—$GeS_2$—X, $Li_2S$—$Ga_2S_3$—X, and $Li_2S$—$B_2S_3$—X (X represents one or more of LiI, $B_2S_3$ and $Al_2S_3$). Further, in a case where the inorganic solid state electrolyte is an amorphous material (a glass), the inorganic solid state electrolyte may contain an oxygen-containing compound such as a lithium phosphate ($Li_3PO_4$), a lithium oxide ($Li_2O$), a lithium sulfate ($Li_2SO_4$), a phosphorus oxide ($P_2O_5$) and a lithium borate ($Li_3BO_3$); and a nitrogen-containing compound such as $Li_3PO_{4-u}N_{2u/3}$ (u is $0<u<4$), $Li_4SiO_{4-u}N_{2u/3}$ (u is $0<u<4$), $Li_4GeO_{4-u}N_{2u/3}$ (u is $0<u<4$), and $Li_3BO_{3-u}N_{2u/3}$ (u is $0<u<3$). Adding the oxygen-containing or nitrogen-containing compound expands void space in the resulting amorphous structure, thereby reducing drag on the movement of lithium ions, and further increasing ion conductivity.

As the lithium salt according to the lithium rechargeable battery of the present invention, a substance soluble in the above non-aqueous electrolyte is used. Examples of such a substance include a salt containing one or more of the following: LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiB_{10}Cl_{10}$, $LiAlCl_4$, $CH_3SO_3Li$, $CF_3SO_3Li$, $(CF_3SO_2)_2NLi$, a chloroborane lithium, a low-grade lithium aliphatic carbonate, a lithium 4-phenyl borate, and an imide group.

For the purpose of improving discharging and charging characteristics and flame retardance, the following compounds can be added to the non-aqueous electrolyte: for example, a pyridine, a triethyl phosphate, a triethanolamine, a cyclic ether, an ethylenediamine, an n-glyme, a hexaphosphoric triamide, a nitrobenzene derivative, a sulfur, a quinonimine dye, an N-substituted oxazolidinone and an N,N-substituted imidazolidine, an ethylene glycol dialkyl ether, an ammonium salt, a polyethylene glycol, a pyrrole, a 2-methoxy ethanol, an aluminum trichloride, a conductive polymer, a monomer of an active material, a triethylene phosphoamide, a trialkyl phosphine, a morpholine, an aryl compound having a carbonyl group, a hexamethylphosphoric triamide and a 4-alkyl morpholine, a dicyclic tertiary amine, oil, a phosphonium salt and a tertiary sulfonium salt, a phosphazene, and a carbonate ester. In order to make the electrolyte solution nonflammable, a halogen solvent, such as a carbon tetrachloride and a trifluoroethylene, can be added to the electrolyte solution. In order to allow the electrolyte solution to have an adequacy in high temperature storage, a carbon dioxide gas can be added to the electrolyte solution.

The lithium rechargeable battery according to the present invention has a superior battery performance, in particular, superior cyclic and load characteristics. The battery can be in the form of a button, a sheet, a cylinder, a square, or a coin.

There is no particular restriction with regard to applications of the lithium rechargeable battery according to the present invention. Examples of applications include as power sources or backup power sources for domestic appliances such as notebook personal computers, laptop personal computers, pocket word processors, portable telephones, cordless terminals, portable CD players, radios, LCD televisions, electric shavers, memory cards, and electronic devices such as video players, automobiles, electric vehicles, game players, and electric tools.

EMBODIMENTS

The present invention is further explained in detail in the following by using the embodiments.

The embodiments are merely for exemplification purposes, and the invention is not limited to these embodiments.

(Property Evaluation)

The property evaluation was conducted in each embodiment by the following measurement method.

(1) Average Particle Size

The average particle size was obtained by using a laser particle size distribution measurement method.

(2) Tap Density

The tap density was obtained based on a method specified in JIS-K-5101 for an apparent density or an apparent specific volume, in which 5 g of sample was placed in a measuring cylinder of 5 ml, set in a DUAL AUTOTAP analyzer (manufactured by Yuasa Ionics Inc.), and tapped 500 times, so as to measure the volume and calculate the apparent density. The calculated apparent density was regarded as the tap density.

(3) Theoretical Ratio Surface Area

The theoretical ratio surface area was calculated by the following equation (2) based on the average particle size:

$$\text{Theoretical ratio surface area } (B) \text{ (m}^2\text{/g)}=6/(\rho \times MA) \quad (2)$$

(wherein $\rho$ represents the density of the specimen, and MA represents the area average particle size of the specimen).

(Preparation of Composite Carbonate Specimen A)

(Preparation of Solution A)

The solution A was prepared by dissolving 12.3 g (0.052 mole) of nickel chloride hexahydrate, 10.3 g (0.052 mole) of manganese chloride tetrahydrate, and 12.3 g (0.052 mole) of cobalt chloride hexahydrate in pure water and further diluting the mixture with pure water, so as to achieve the total amount of 58 ml.

(Preparation of Solution B)

The solution B was prepared by dissolving 68 g (0.81 mole) of sodium hydrogen carbonate in pure water and further diluting the mixture with pure water, so as to achieve the total amount of 850 ml.

(Preparation of Solution C)

The solution C was prepared by dissolving 0.42 g (0.0072 mole) of sodium chloride and 0.89 g (0.011 mole) of sodium hydrogen carbonate in pure water and further diluting the mixture with pure water, so as to achieve the total amount of 20 ml.

The composition of each solution is as follows:
Solution A: 0.90 mole/L of Ni, 0.09 mole/L of Mn, 0.90 mole/L of Co, 5.38 mole/L of Cl
Solution B: 0.95 mole/L of $CO_3$, 0.95 mole/L of Na
Solution C: 0.53 mole/L of $CO_3$, 0.36 mole/L of Cl, 0.89 mole/L of Na The entire amount of the solution C was placed in a reaction vessel, and the fluid temperature was maintained at 80° C. Then, while agitating the solution C at 1200 rpm, the entire amount of the solutions A and B were simultaneously added to the solution C by a falling-drop method at a constant speed over 8 hours. After the dropping process was finished, the mixture was separated into a solid and a liquid portion in a conventional manner. The collected substance was dried at 50° C. for 12 hours and lightly ground, so as to obtain powder of 18.3 g (yield: 99%). Then, the obtained powder was measured by an XRD and ICP analysis and was revealed to be a composite carbonate containing nickel, manganese, cobalt at a molar ratio of 1.00:0.99:0.98.

(Preparation of Composite Carbonate Specimen B)

The solutions A, B, and C that were same as those used to prepare the composite carbonate specimen A were prepared. The entire amount of the solution C was placed in a reaction vessel, and the fluid temperature was maintained at 80° C. Then, while agitating the solution C at 2400 rpm, the entire amount of the solutions A and B were simultaneously added to the solution C by a falling-drop method at a constant speed over 3.5 hours. After the dropping process was finished, the mixture was separated into a solid and a liquid portion in a conventional manner. The collected substance was dried at 50° C. for 12 hours and lightly ground, so as to obtain powder of 18.0 g (yield: 98%). Then, the obtained powder was measured by an XRD and ICP analysis and was revealed to be a composite carbonate containing nickel, manganese, and cobalt at a molar ratio of 1.00:1.02:1.00.

(Preparation of Composite Carbonate Specimen C)

(Preparation of Solution A)

The solution A was prepared by dissolving 139 g (0.58 mole) of nickel chloride hexahydrate, 116 g (0.58 mole) of manganese chloride tetrahydrate, and 12.3 g (0.58 mole) of cobalt chloride hexahydrate in pure water and further diluting the mixture with pure water, so as to achieve the total amount of 650 ml.

(Preparation of Solution B)

The solution B was prepared by dissolving 720 g (8.75 mole) of sodium hydrogen carbonate in pure water and further diluting the mixture with pure water, so as to achieve the total amount of 9 L.

The composition of each solution is as follows:
Solution A: 0.9 mole/L of Ni, 0.9 mole/L of Mn, 0.9 mole/L of Co, 5.4 mole/L of Cl
Solution B: 0.95 mole/L of $CO_3$, 0.95 mole/L of Na Pure water of 100 ml was placed in an overflow reaction vessel of 300 ml, and the fluid temperature was maintained at 80° C. Then, while agitating the fluid at 1200 rpm, the entire amount of the solutions A and B were added to the reaction vessel using a pump by a falling-drop method at a constant speed over 90 hours. The addition rate of the Ni, Mn, and Co contained in the solution A were respectively 0.02 mole/hour/liter in terms of metal atoms. The addition rate of the solution B was 0.32 mole/hour/liter in terms of $CO_3$. An average residence time was 2.8 hours. Approximately 10 kg of overflow slurry was collected from the reaction vessel, and the collected slurry was separated into a solid and a liquid portion in a conventional manner. The collected slurry was dried at 50° C. for 12 hours and lightly ground, so as to obtain powder of 212 g (yield: 103%). Then, the obtained powder was measured by an XRD and ICP analysis and was revealed to be a composite carbonate containing nickel, manganese, and cobalt at a molar ratio of 1.00:1.02:0.97.

(Preparation of Composite Carbonate Specimen D)

(Preparation of Solution A)

The solution A was prepared in the same manner as that used in the preparation of the composite carbonate specimen A.

(Preparation of Solution B)

The solution B was prepared in the same manner as that used in the preparation of the composite carbonate specimen A.

(Preparation of Solution C)

The solution C was prepared by dissolving 0.89 g (0.011 mole) of sodium hydrogen carbonate in pure water and further diluting the mixture with pure water, so as to achieve the total amount of 20 ml.

The composition of each solution is as follows:
  Solution A: 0.90 mole/L of Ni, 0.09 mole/L of Mn, 0.90 mole/L of Co, 5.38 mole/L of Cl
  Solution B: 0.95 mole/L of $CO_3$, 0.95 mole/L of Na
  Solution C: 0.53 mole/L of $CO_3$, 0.53 mole/L of Na The entire amount of the solution C was placed in a reaction vessel, and the fluid temperature was maintained at 80° C. Then, while agitating the solution C at 1200 rpm, the entire amount of the solutions A and B were simultaneously added to the solution C by a falling-drop method at a constant speed over 8 hours. After the dropping process was finished, the mixture was separated into a solid and a liquid portion in a conventional manner. The collected substance was dried at 50° C. for 12 hours and lightly ground, so as to obtain powder of 17.0 g (yield: 93%). Then, the obtained powder was measured by an XRD and ICP analysis and was revealed to be a composite carbonate containing nickel, manganese, and cobalt at a molar ratio of 1.00:1.00:0.96.

(Preparation of Composite Carbonate Specimen E)

(Preparation of Solution A)

The solution A was prepared in the same manner as that used in the preparation of the composite carbonate specimen A.

(Preparation of Solution B)

The solution B was prepared in the same manner as that used in the preparation of the composite carbonate specimen A.

The composition of each solution is as follows:
  Solution A: 0.90 mole/L of Ni, 0.09 mole/L of Mn, 0.90 mole/L of Co, 5.38 mole/L of Cl
  Solution B: 0.95 mole/L of $CO_3$, 0.95 mole/L of Na Pure water of 20 ml was placed in a reaction vessel, and the fluid temperature was maintained at 80° C. Then, while agitating the fluid at 1200 rpm, the entire amount of the solutions A and B were added to the reaction vessel by a falling-drop method at a constant speed over 8 hours. After the dropping process was finished, the mixture was separated into a solid and a liquid portion in a conventional manner. The collected substance was dried at 50° C. for 12 hours and lightly ground, so as to obtain powder. Then, the obtained powder was measured by an XRD and ICP analysis and was revealed to be a composite carbonate containing nickel, manganese, and cobalt at a molar ratio of 1.00:0.97:0.97.

(Composite Carbonate Specimen F)

The solution A was prepared by dissolving 60.0 g of nickel sulfate, 117.0 g of manganese sulfate, and 64.5 g of cobalt sulfate in pure water, such that a molar ratio of Ni—Mn—Co was 0.20-0.60-0.20. Thereby, the total amount of 500 ml was obtained. The solution B was prepared by dissolving 107.5 g of ammonium bicarbonate in pure water and further diluting the fluid by an aqueous solution in which 83.5 ml of concentrated ammonia was dissolved in pure water. Thereby, the total amount of 500 ml was obtained. Next, 75 ml of reserve water was placed in a stirred reaction vessel of approximately 3 L, and the water was heated up to 43° C. While continuously heating the water, the solutions A and B were respectively added to the reaction vessel in an alternate manner by using a metering pump at a flow rate of a few ml/min over approximately 10 hours. After adding these solutions completely, the mixture was agitated for 1 hour, so as to promote further crystal growth. Then, the separated sediment was filtered, washed with water, and dried for a whole day and night, so as to obtain a nickel manganese cobalt composite carbonate. The obtained powder was measured by an XRD and ICP analysis and was revealed to be a composite carbonate containing nickel, manganese, and cobalt at a molar ratio of 1.00:1.00:0.96.

(Preparation of Composite Carbonate Specimen G)

The solution A was 400 ml of a mixed aqueous solution containing a nickel sulfate, a cobalt sulfate, and a manganese sulfate at a molar ratio of 0.4 mole in terms of nickel ions, cobalt ions, and manganese ions, respectively. The solution B was 500 ml of an aqueous solution containing a sodium acid carbonate at a molar ratio of 1.6 mole in terms of carbonate ions. The solution A and the solution B were added in a parallel manner into a reaction vessel, which contained 300 ml of pure water at a temperature of 50° C., over 6 hours while maintaining the temperature and agitating the mixture, so as to achieve a neutralized state. After the filtering and washing of the obtained substance, a composite carbonate containing nickel, cobalt, and manganese at a molar ratio of 1:1:1 was obtained. Then, the obtained powder was measured by an XRD and ICP analysis and was revealed to be a composite carbonate containing nickel, manganese, and cobalt at a molar ratio of 1.00:1.01:0.98.

(Composite Hydroxide Specimen H)

A composite hydroxide H is a commercially available composite hydroxide having an average particle size of 10.9 μm, a BET ratio surface area of 6.6 $m^2$/g, and a tap density of 2.09 g/ml.

TABLE 1

| | Ni—Co—Mn based specimen | Average particle size (μm) | BET ratio surface area ($m^2$/g) | Particle shape | Tap density (g/ml) |
| --- | --- | --- | --- | --- | --- |
| Specimen A | Composite carbonate | 10 | 58.1 | Spherical shape | 1.85 |
| Specimen B | Composite carbonate | 6.2 | 50.4 | Spherical shape | 1.72 |

TABLE 1-continued

| Ni—Co—Mn based specimen | | Average particle size (μm) | BET ratio surface area (m²/g) | Particle shape | Tap density (g/ml) |
|---|---|---|---|---|---|
| Specimen C | Composite carbonate | 23.6 | 86.9 | Spherical shape | 1.77 |
| Specimen D | Composite carbonate | 4.6 | 96.6 | Spherical shape | 1.41 |
| Specimen E | Composite carbonate | 4.8 | 58.4 | Spherical shape | 1.45 |
| Specimen F | Composite carbonate | 7.7 | 38.0 | Spherical shape | 1.65 |
| Specimen G | Composite carbonate | 4.5 | 187.9 | Spherical shape | 1.02 |
| Specimen H | Composite hydroxide | 10.9 | 6.6 | Spherical shape | 2.09 |

Embodiments 1-4 and Comparative Examples 1-7

The Ni—Co—Mn based specimen previously prepared and a lithium carbonate (having an average particle size of 4.5 μm) were weighed so that the molar ratio of the lithium atoms to the total number of the nickel atoms, manganese atoms, and cobalt atoms achieved 1.03 and were thoroughly mixed using a mixer. The mixture was then sintered at a temperature shown in the table 2 for 10 hours in an air atmosphere, so as to obtain each lithium nickel manganese cobalt composite oxide specimen. FIGS. 1-4 are SEM images of the lithium nickel manganese cobalt composite oxide obtained in embodiment 2 and comparative example 4.

TABLE 2

| | Type of Ni—Mn—Co based specimen | Sintering temperature (° C.) | Composition of M (molar ratio) | | |
|---|---|---|---|---|---|
| | | | Ni | Mn | Co |
| Embodiment 1 | Specimen A | 700 | 1.00 | 0.99 | 0.96 |
| Embodiment 2 | Specimen A | 800 | 1.00 | 0.99 | 0.97 |
| Embodiment 3 | Specimen B | 800 | 1.00 | 1.02 | 0.96 |
| Embodiment 4 | Specimen C | 800 | 1.00 | 1.02 | 0.96 |
| Comparative example 1 | Specimen A | 600 | 1.00 | 0.98 | 0.96 |
| Comparative example 2 | Specimen H | 800 | 1.00 | 1.03 | 0.95 |
| Comparative example 3 | Specimen A | 900 | 1.00 | 0.99 | 0.95 |
| Comparative example 4 | Specimen A | 1000 | 1.00 | 0.98 | 0.96 |
| Comparative example 5 | Specimen D | 800 | 1.00 | 1.00 | 0.96 |
| Comparative example 6 | Specimen F | 800 | 1.00 | 1.00 | 0.96 |
| Comparative example 7 | Specimen G | 800 | 1.00 | 1.01 | 0.98 |

TABLE 3

| | Average particle size (μm) | (A)BET ratio surface area (m²/g) | (B)Theoretical ratio surface area | A/B | Tap density (g/ml) |
|---|---|---|---|---|---|
| Embodiment 1 | 9.1 | 18.4 | 0.40 | 46.5 | 1.71 |
| Embodiment 2 | 9.1 | 9.2 | 0.40 | 22.9 | 1.75 |
| Embodiment 3 | 5.8 | 7.6 | 0.62 | 12.2 | 1.71 |
| Embodiment 4 | 20.7 | 8.5 | 0.17 | 48.7 | 1.71 |
| Comparative example 1 | 9.3 | 31.1 | 0.39 | 79.5 | 1.64 |
| Comparative example 2 | 11.0 | 0.4 | 0.30 | 1.5 | 2.08 |
| Comparative example 3 | 9.6 | 1.7 | 0.38 | 4.6 | 1.85 |
| Comparative example 4 | 13.1 | 0.5 | 0.25 | 1.9 | 1.72 |
| Comparative example 5 | 4.8 | 7.5 | 0.76 | 9.9 | 1.43 |
| Comparative example 6 | 10.6 | 1.5 | 0.35 | 4.1 | 1.69 |
| Comparative example 7 | 5.6 | 11.4 | 0.60 | 19.1 | 1.04 |

(Evaluation of Battery Characteristics)

(1) Lithium Rechargeable Battery Fabrication

A cathode mix was obtained by mixing 85 wt % of lithium nickel manganese cobalt composite oxide obtained in embodiments 1-4 and comparative examples 1-7, 10 wt % of graphite powder, and 5 wt % of polyvinylidene fluoride. The cathode mix was dispersed in N-methyl-2-pyrrolidinone to prepare a kneaded paste. The kneaded paste was applied to an aluminum foil. The aluminum foil was then dried and pressed, and a disk having a diameter of 15 mm was stamped out to obtain a cathode plate. A lithium rechargeable battery was fabricated by using the cathode plate and other components such as a separator, an anode, a cathode, current collectors, mounting hardware, external terminals, and an electrolyte. A metallic lithium foil was used as the anode. The electrolyte was prepared by dissolving one mole of $LiPF_6$ in 1 liter of a kneaded solution containing 1:1 of ethylene carbonate and methyl ethyl carbonate.

(2) Battery Performance Evaluation

The fabricated lithium rechargeable battery was operated in room temperature, and an initial discharging capacity, initial charge/discharge efficiency, and load and cyclic characteristics were evaluated. The results are shown in table 4.

(Methods for Evaluating Initial Discharging Capacity and Initial Charge/Discharge Efficiency)

The cathode was charged to 4.3 V by using a constant current/constant voltage (CCCV) charging technique at 1.0 C for 5 hours, and then, was discharged to 2.7 V at a discharging rate of 0.2 C. Then, an initial discharging capacity and initial charge/discharge efficiency were measured. The results are shown in table 4. The initial charge/discharge efficiency was calculated according to the following equation.

Initial charge/discharge efficiency (%)=[(Initial discharging capacity)/(Initial charging capacity)]×100

(Load Characteristic Evaluation)

The fabricated lithium rechargeable battery was operated in room temperature, and a load characteristic was evaluated. The cathode was charged to 4.3 V by using a constant current/constant voltage (CCCV) charging technique at 0.5 C for 5 hours, and then, was discharged to 2.7 V at a discharging rate of 0.2 C. A discharging capacity was measured for each cycle of the charging and discharging operations. Three cycles of the operations were repeated. From the discharging capacity of the $1^{st}$ to $3^{rd}$ cycles, an additive average value of each discharging capacity was calculated. The value found by the calculation was regarded as a discharging capacity at 0.2 C. The above operation was performed at 2 C in the same manner, so as to calculate a discharging capacity. Based on these two values, a discharging capacity ratio (2 C/0.2 C) was calculated. The results are shown in table 4. The larger a value is, the more superior a load characteristic is.

(Cyclic Characteristic Evaluation)

The fabricated lithium rechargeable battery was operated at 25° C., and a capacity maintenance ratio was evaluated. The cathode was charged to 4.3 V by using a constant current/constant voltage (CCCV) charging technique at 0.5 C for 5 hours, and then, was discharged to 2.7 V at a discharging rate of 0.2 C. A discharging capacity was measured for each cycle of the charging and discharging operations. Twenty cycles of the operations were repeated. A capacity maintenance ratio was calculated according to the following equation. The results are shown in table 4.

Capacity maintenance ratio (%)=[(Discharging capacity at the $20^{th}$ cycle)/(Discharging capacity at the $1^{st}$ cycle)]×100

TABLE 4

| | Initial discharging capacity (mAh/g) | Initial charge/discharge efficiency (mAh/g) | Load characteristic | Cyclic characteristic capacity maintenance ratio (%) |
|---|---|---|---|---|
| Embodiment 1 | 163 | 91 | 0.87 | 93 |
| Embodiment 2 | 166 | 94 | 0.88 | 97 |
| Embodiment 3 | 169 | 93 | 0.90 | 98 |
| Embodiment 4 | 165 | 93 | 0.88 | 96 |
| Comparative example 1 | 141 | 90 | 0.66 | 84 |
| Comparative example 2 | 153 | 70 | 0.79 | 84 |
| Comparative example 3 | 156 | 88 | 0.84 | 85 |
| Comparative example 4 | 158 | 88 | 0.83 | 87 |
| Comparative example 5 | 145 | 83 | 0.85 | 84 |
| Comparative example 6 | 131 | 71 | 0.35 | 80 |
| Comparative example 7 | 158 | 89 | 0.86 | 87 |

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A lithium nickel manganese cobalt composite oxide used as a cathode active material for a lithium rechargeable battery, the composite oxide shown by the below general formula (1):

$$Li_xNi_{1-y-z}Mn_yCo_zO_2 \qquad (1),$$

(wherein $0.9 \leq x \leq 1.3$, $0 < y < 1.0$, and $0 < z < 1.0$; and wherein $y+z<1$), the lithium nickel manganese cobalt composite oxide having an average particle size of 5-40 μm, a BET ratio surface area of 5-25 m²/g, and a tap density of equal to or higher than 1.70 g/ml, and a ratio (A/B) of BET ratio surface area (A) against theoretical ratio surface area (B) of 5-50.

2. The lithium nickel manganese cobalt composite oxide used as a cathode active material for a lithium rechargeable battery according to claim 1, wherein the composite oxide is obtained by mixing a lithium compound with a composite carbonate containing nickel atoms, manganese atoms, and cobalt atoms and having an average particle size of 5-40 μm, a BET ratio surface area of equal to or larger than 40 m²/g, and a tap density of equal to or higher than 1.7 g/m, so as to obtain a mixed sintering material, and then by sintering the mixed sintering material.

3. A manufacturing method of a lithium nickel manganese cobalt composite oxide used as a cathode active material for a lithium rechargeable battery, comprising mixing a lithium compound with a composite carbonate containing nickel atoms, manganese atoms, and cobalt atoms at a molar ratio in a range of 1:0.5-2.0:0.5-2.0 and having an average particle size of 5-40 μm, a BET ratio surface area of equal to or larger than 40 m²/g, and a tap density of equal to or higher than 1.7 g/ml, so as to obtain a mixed sintering material; and sintering the mixed sintering material at 650-850° C., so as to obtain the lithium nickel manganese cobalt composite oxide shown in the below general formula (1):

$$Li_xNi_{1-y-z}Mn_yCo_zO_2 \qquad (1)$$

(wherein $0.9 \leq x \leq 1.3$, $0<y<1.0$, and $0<z<1.0$; and wherein $y+z<1$).

4. A lithium rechargeable battery comprising the lithium nickel manganese cobalt composite oxide of claim 1 as a cathode active material.

5. A lithium rechargeable battery comprising the lithium nickel manganese cobalt composite oxide of claim 2 as a cathode active material.

* * * * *